United States Patent [19]

Takebayashi et al.

[11] Patent Number: 5,761,639
[45] Date of Patent: Jun. 2, 1998

[54] METHOD AND APPARATUS FOR TIME SERIES SIGNAL RECOGNITION WITH SIGNAL VARIATION PROOF LEARNING

[75] Inventors: Yoich Takebayashi; Hiroshi Kanazawa; Hiroyuki Chimoto, all of Tokyo, Japan

[73] Assignee: Kabushiki Kaisha Toshiba, Kawasaki, Japan

[21] Appl. No.: 295,170

[22] Filed: Aug. 24, 1994

Related U.S. Application Data

[63] Continuation-in-part of Ser. No. 115,706, Sep. 3, 1993, abandoned, which is a continuation of Ser. No. 908,514, Jun. 26, 1992, abandoned, which is a continuation of Ser. No. 492,451, Mar. 13, 1990, abandoned.

[30] Foreign Application Priority Data

Mar. 13, 1989 [JP] Japan ................................. 1-057978
Aug. 24, 1993 [JP] Japan ................................. 5-209094

[51] Int. Cl.$^6$ ........................................................ G10L 5/06
[52] U.S. Cl. ............................................. 704/253; 704/233
[58] Field of Search ................................. 381/41–43, 46, 381/47; 395/2.42, 2.53, 2.57, 2.62; 704/233, 244, 248, 253

[56] References Cited

U.S. PATENT DOCUMENTS

| | | | |
|---|---|---|---|
| 4,100,370 | 7/1978 | Suzuki et al. | 395/2.55 |
| 4,481,593 | 11/1984 | Bahler | 395/2.62 |
| 4,783,802 | 11/1988 | Takebayashi et al. | 395/2.42 |
| 4,852,181 | 7/1989 | Morito et al. | 395/2.42 |

OTHER PUBLICATIONS

Boll, "Suppression of Acoustic Noise in Speech Using Spectral Subtraction," IEEE Transion ASSP, vol. ASSP–27, No. 2, Apr. 1979, pp. 113–120.

*Primary Examiner*—David D. Knepper
*Attorney, Agent, or Firm*—Foley & Lardner

[57] ABSTRACT

A time series signal recognition capable of obtaining a high recognition rate even for the speech data with low S/N ratio in noisy environments. The time series signals are recognized by extracting a plurality of candidate feature vectors characterizing an individual time series signal, without fixing a boundary for the individual time series signal. Similarity values are calculated for each of the plurality of candidate feature vectors and the reference patterns stored in the recognition dictionary, from which one reference pattern for which the similarity value is greater than a prescribed threshold value is selected as a recognition result. New reference patterns to be stored in the recognition dictionary are learned by acquiring actual background noise of the apparatus, and mixing prescribed noiseless signal patterns with the acquired background noise to form signal patterns for learning. The signal patterns for learning are recognized by extracting features vectors for learning from the signal patterns for learning, and the new reference patterns are obtained from the extracted feature vectors for learning. The learning process is iterated at different noise levels, so as to optimize the determination of the word boundary. The background noise may be constantly acquired, and learning can be carried out using the noise data acquired immediately before the speech data is input.

23 Claims, 14 Drawing Sheets

METHOD AND APPARATUS FOR TIME SERIES SIGNAL RECOGNITION WITH SIGNAL VARIATION PROOF LEARNING

This is a continuation-in-part application of our earlier, commonly assigned application Ser. No. 08/115,706 filed Sep. 3, 1993, now abandoned, which is in turn a continuation application of our commonly assigned application Ser. No. 07/908,514 filed Jun. 26, 1992 and abandoned, which is in turn a continuation application of our commonly assigned application Ser. No. 07/492,451 filed Mar. 13, 1990 and abandoned.

BACKGROUND OF THE INVENTION

1. Field of the Invention

The present invention relates to an apparatus for recognizing time series signals such as human speech and other acoustic signals.

2. Description of the Background Art

Conventionally, a time series signal recognition such as a speech recognition has been achieved basically by first performing a so called segmentation in which a word boundary is detected in the time series signals, and then looking for a matching between a reference pattern in a speech recognition dictionary and a word feature parameter extracted from the signal within the detected word boundary. There are several speech recognition methods which fall within this category of the prior art, which include the DP matching, the HMM (Hidden Markov Model), and the multiple similarity (partial space) method.

However, in more realistic noisy environments, there has been a problem in practice that there are as many recognition errors due to failure of the appropriate word boundary detection as those due to false pattern matching.

Namely, the detection of the word boundary has conventionally been performed with energy or pitch frequency as a parameter, so that highly accurate recognition tests can be performed in a quiet experiment room, but the recognition rate drastically decreases for more practical locations for use such as those inside offices, cars, stations, or factories.

To cope with this problem, there has been a proposition of a speech recognition method called a word spotting (continuous pattern matching) method in which the word boundary is taken to be not fixed but flexible, but this method is associated with another kind of recognition error problem.

This can be seen from the diagram of FIG. 1 in which an example of a time series for an energy of a signal is depicted along with indications for three different noise levels. As shown in FIG. 1, the word boundary for this signal progressively gets narrower as the noise level increases from N1 to N2 and to N3, which are indicated as intervals (S1, E1), (S2, E2), and (S3, E3), respectively. However, the speech recognition dictionary is usually prepared by using the word feature vectors obtained by using the specific word boundaries and the specific noise level, so that when such a conventional speech recognition dictionary is used with the word spotting method, the matching with the word feature vector obtained from an unfixed word boundary for a speech mixed with noise having a low signal/noise ratio becomes troublesome, and many recognition errors are caused conventionally for this reason.

On the other hand, for a speech recognition method using a fixed word boundary, there has been a proposition of a learning system for a speech recognition dictionary in which the speech variations are taken into account artificially, as disclosed in U.S. Pat. No. 4,783,802 for example, but no effective learning system has been known for the word spotting method, so that the word spotting method has been plagued by the problem of excessive recognition errors.

Thus, conventionally, although a sufficiently high recognition rate has been obtainable for experiments performed in a favorable noiseless environment such as an experimental room, conducted by an experienced experimenter, a low recognition rate resulted in a case with a more practical noisy environment with an inexperienced speaker because of errors in word boundary detection, and this has been a major obstacle for realization of a practical speech recognition system. Furthermore, the speech recognition dictionary and the word boundary detection has been developed rather independent of each other, so that no effective learning system has been known for the speech recognition method using an unfixed word boundary such as the word spotting method.

It is also to be noted that these problems are relevant not only for the speech recognition, but also for the recognition of other time series signals, such as those of vibrations or various sensor signals.

On the other hand, conventionally, a time series signal recognition such as a speech recognition under the noisy environment has been achieved basically by removing the noise signals superposed onto the input speech signals using the noise subtraction scheme to extract the speech signal alone, then performing the segmentation to detect a word boundary, and then looking for a matching between a reference pattern in a speech recognition dictionary and a word feature parameter extracted from the speech signal within the detected word boundary.

However, the noise subtraction scheme simply subtracts the average power level of the background noises in each frequency bandwidth from the input speech signals, so that it is only effective to some extent for the speech signals with the high S/N ratio which are superposed with the stationary noise such as the white noise, but it is nearly ineffective for the speech signals with the low S/N ratio or the speech signals superposed with the non-stationary noise, and this has been the major problem in the practical realization of the effective speech recognition.

Thus, in the conventional time series recognition method, it has been impossible to sufficiently deal with the change of the environment or time to use the time series recognition, and the recognition performance has been poor for the speech data with a low S/N ratio.

SUMMARY OF THE INVENTION

It is therefore an object of the present invention to provide a method and an apparatus for time series signal recognition capable of obtaining a high recognition rate even in noisy environments in which the signals are subjected to rather large variations.

It is another object of the present invention to provide a method and an apparatus for time series signal recognition capable of dealing with the change of the environment or time to use the time series recognition.

It is another object of the present invention to provide a method and an apparatus for time series signal recognition capable of obtaining a high recognition rate even for the speech data with low S/N ratio.

According to one aspect of the present invention, there is provided an apparatus for time series signal recognition, comprising: means for inputting input signal patterns for time series signals to be recognized; means for recognizing the input signal patterns, including: means for extracting a multiplicity of candidate feature vectors characterizing an individual time series signal from the input signal patterns, without fixing a boundary for the individual time series signal in the input signal patterns; recognition dictionary means for storing reference patterns with which the individual time series signal is to be matched; means for calculating similarity values for each of the multiplicity of candidate feature vectors and the reference patterns stored in the recognition dictionary means; and means for determining a recognition result by selecting reference patterns stored in the recognition dictionary means, for which the similarity value calculated by the calculating means is greater than a prescribed threshold value; and means for learning new reference patterns to be stored in the recognition dictionary means, including: means for acquiring background noise of the apparatus; means for mixing prescribed noiseless signal patterns with the background noise acquired by the acquiring means to form signal patterns for learning; learning recognition means for recognizing the signal patterns for learning by extracting feature vectors for learning from the signal patterns for learning; and means for obtaining the new reference patterns from the feature vectors for learning extracted by the learning recognition means for storage in the recognition dictionary.

According to another aspect of the present invention there is provided a method of time series signal recognition, comprising the steps of: inputting input signal patterns for time series signals to be recognized; recognizing the input signal patterns, including the steps of: extracting a multiplicity of candidate feature vectors characterizing an individual time series signal from the input signal patterns, without fixing a boundary for the individual time series signal in the input signal patterns; storing reference patterns with which the individual time series signal is to be matched in a recognition dictionary means; calculating similarity values for each of the multiplicity of candidate feature vectors and the reference patterns stored in the recognition dictionary means; and determining a recognition result by selecting the reference patterns stored in the recognition dictionary means, for which the similarity value calculated at the calculating step is greater than a prescribed threshold value; and learning new reference patterns to be stored in the recognition dictionary means, including the steps of: acquiring background noise of the apparatus; mixing prescribed noiseless signal patterns with the background noise acquired at the acquiring step to form signal patterns for learning; carrying out a learning process by recognizing the signal patterns for learning by extracting feature vectors for learning from the signal patterns for learning; obtaining the new reference patterns from the feature vectors for learning extracted at the carrying out step; and storing the new reference patterns in the recognition dictionary.

Other features and advantages of the present invention will become apparent from the following description taken in conjunction with the accompanying drawings.

DETAILED DESCRIPTION OF THE PREFERRED EMBODIMENTS

Figure 1:
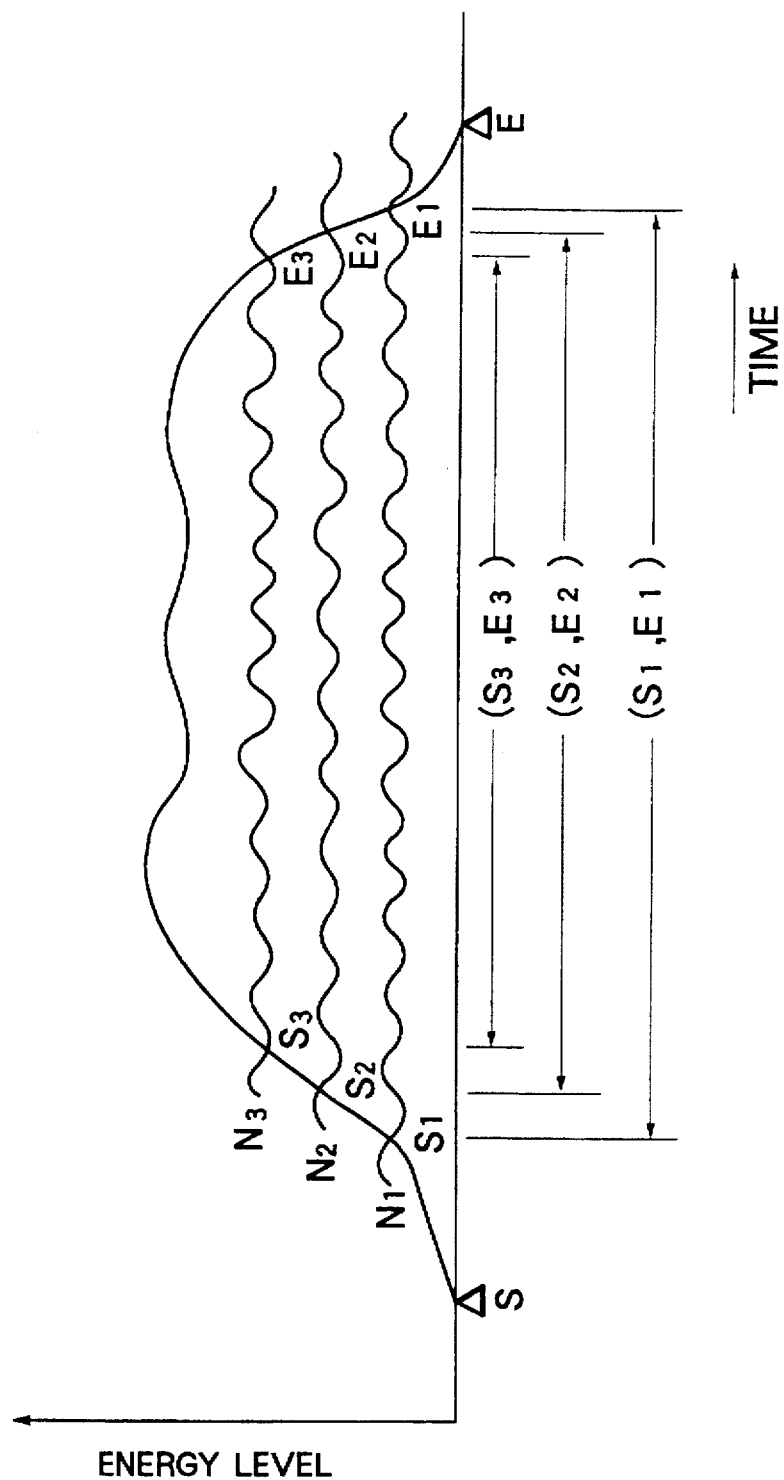
FIG. 1 is a diagram for explaining a problem of speech recognition related to a speech recognition dictionary for the word spotting method in a conventional speech recognition apparatus.
Figure 2:
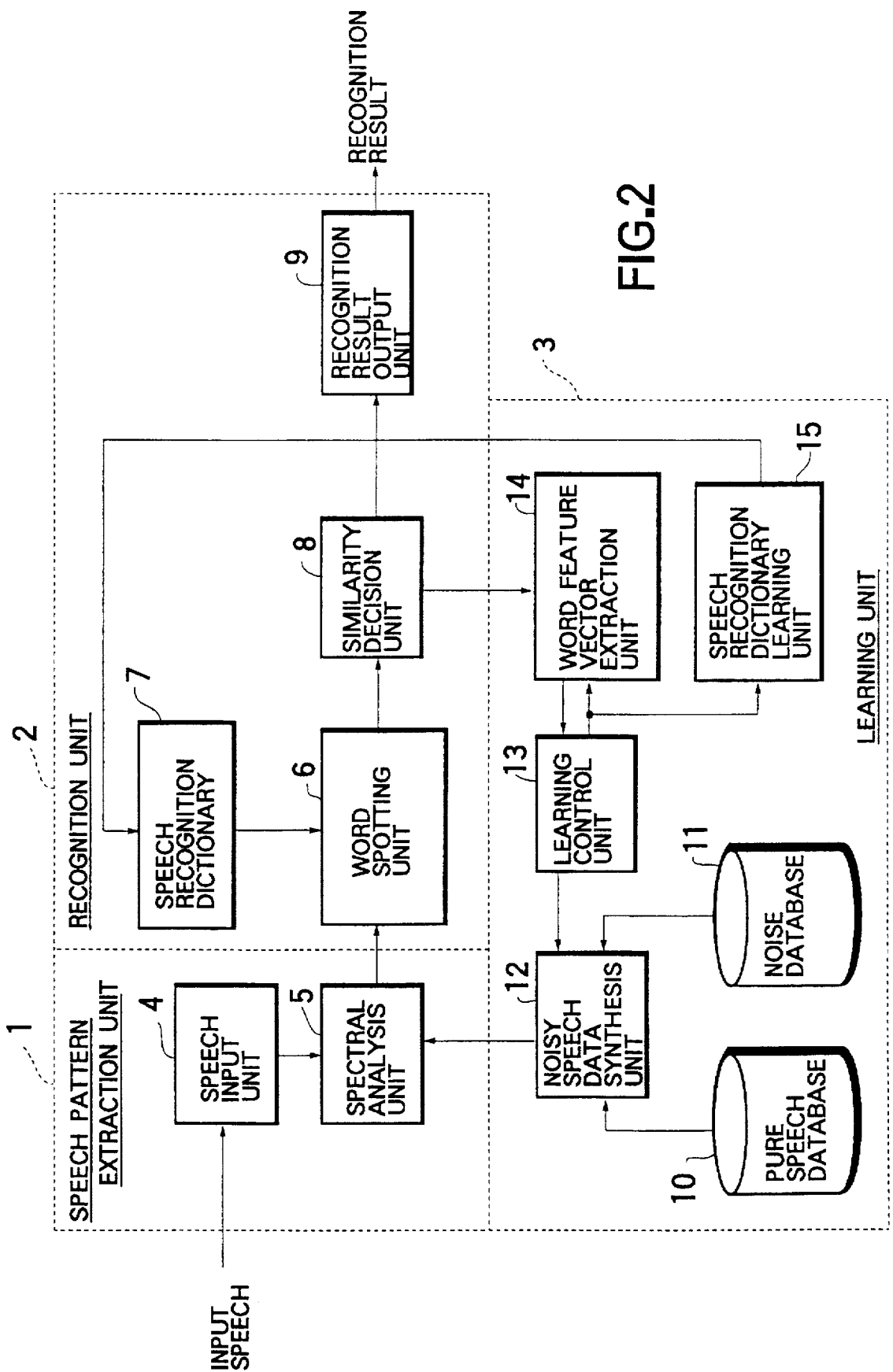
FIG. 2 is a block diagram for one embodiment of a time series recognition apparatus according to the present invention.

Referring now to FIG. 2, there is shown one embodiment of a time series recognition apparatus according to the present invention, in a form of a speech recognition apparatus.

In this embodiment, the apparatus generally comprises a speech pattern extraction unit 1, a recognition unit 2, and a learning unit 3, and operates in two operational modes, one being a speech recognition mode and one being a learning mode.

The speech pattern extraction unit 1 comprises a speech input unit 4 for receiving input speech to be given to the apparatus, and a spectral analysis unit 5 for analyzing the spectrum of the input speech to extract parametrized speech patterns to be recognized by the recognition unit 2.

The recognition unit 2 comprises a word spotting unit 6 for obtaining word feature vectors from the extracted speech patterns, and making matchings of the obtained word feature vectors by calculating the similarity values for the obtained word feature vectors, a speech recognition dictionary 7 for storing reference patterns with respect to which matching of the obtained word feature vectors are to be sought, a similarity decision unit 8 for determining a recognition result in accordance with the matching made at the word spotting unit 6, and a recognition result output unit 9 for outputting the determined recognition result.

Figure 3:
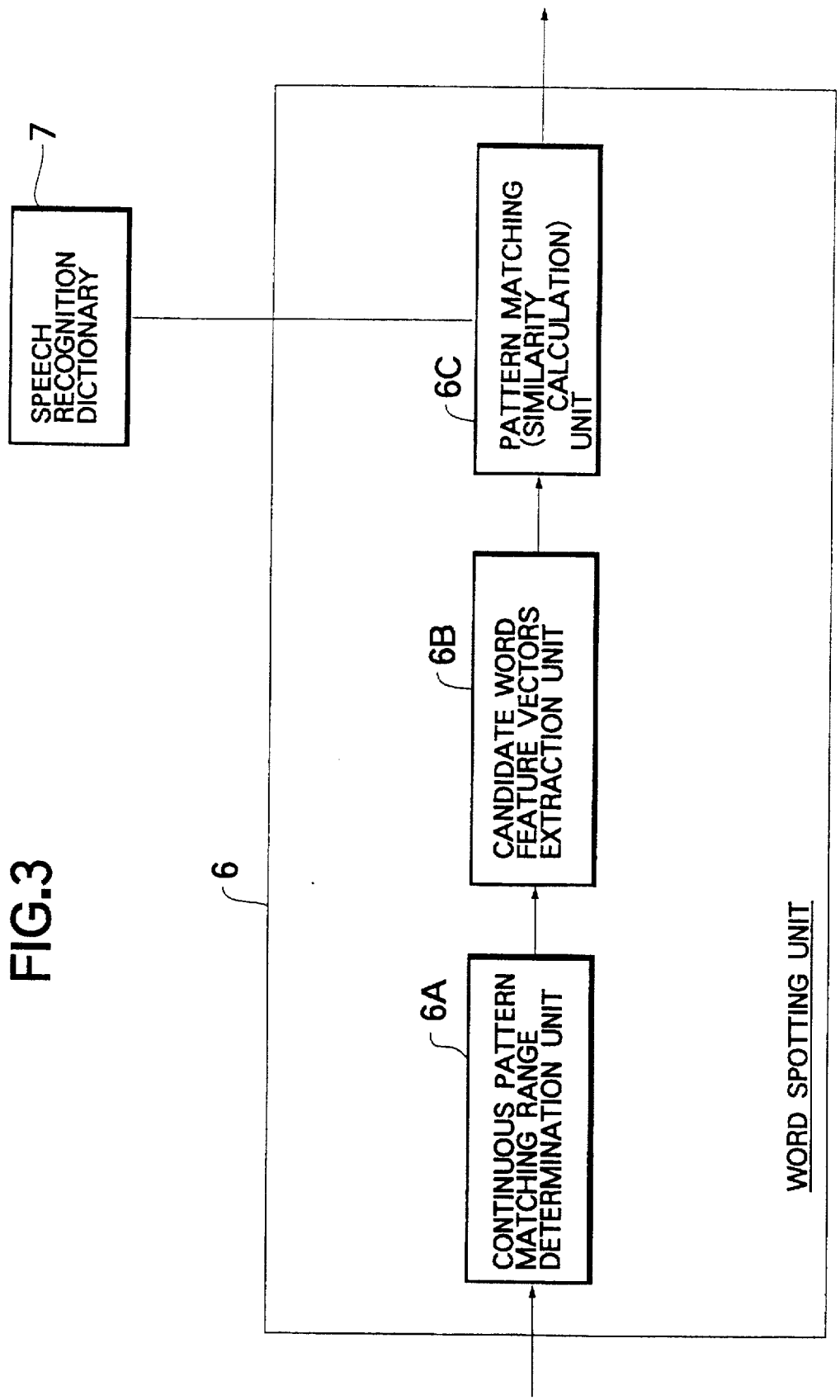
FIG. 3 is a block diagram for a word spotting unit in the apparatus of FIG. 2.

As shown in FIG. 3, the word spotting unit 6 further comprises a continuous pattern matching range determination unit 6A for determining a range for each pattern matching to be made, a candidate word feature vectors extraction unit 6B for extracting a multiplicity of candidate word feature vectors within each determined range, and a pattern matching (similarity calculation) unit 6C for calculating the similarity values.

Referring back to FIG. 2, the learning unit 3, which is utilized in the learning mode only, comprises a pure speech database 10 for storing noiseless speech data for learning, a noise database 11 for storing noise data for learning, to be mixed with the noiseless speech data, a noisy speech data synthesis unit 12 for mixing the noiseless speech data and the noise data to obtain noisy speech data for learning, a learning control unit 13 for controlling the learning process, a word feature vector extraction unit 14 for obtaining the word feature vector of the maximum similarity value as a word feature vector for learning, and a speech recognition dictionary learning unit 15 for obtaining a reference pattern to be stored in the speech recognition dictionary 7 from the word feature vector of the maximum similarity value obtained by the word feature vector extraction unit 14.

The function of each element enumerated above will become apparent from the following description of the speech recognition and learning modes of operations of the apparatus.

Now, the operation of this apparatus in the speech recognition mode will be described.

In the speech recognition mode, the input speech is transmitted through a microphone (not shown) to the speech input unit 4, and the parametrized speech pattern is extracted from this input speech at the spectral analysis unit 5 by using such data processing operations as FFT (fast Fourier transform), filter analysis, LPC (linear predictive coding) analysis, and cepstrum processing. This extraction of the parametrized speech pattern can be performed, for example, by deriving a pattern parametrized by a particular characteristic parameter of the input speech, such as pitch frequency, using a 16 channel filter bank output taken at a constant time interval (8 msec, for instance). Such a 16 channel filter bank output is transmitted to the recognition unit 2 at every frame period (8 msec, for instance).

At the recognition unit 2, matching between the reference patterns in the speech recognition dictionary 7 and the word feature vectors is made in the following manner.

Figure 4:
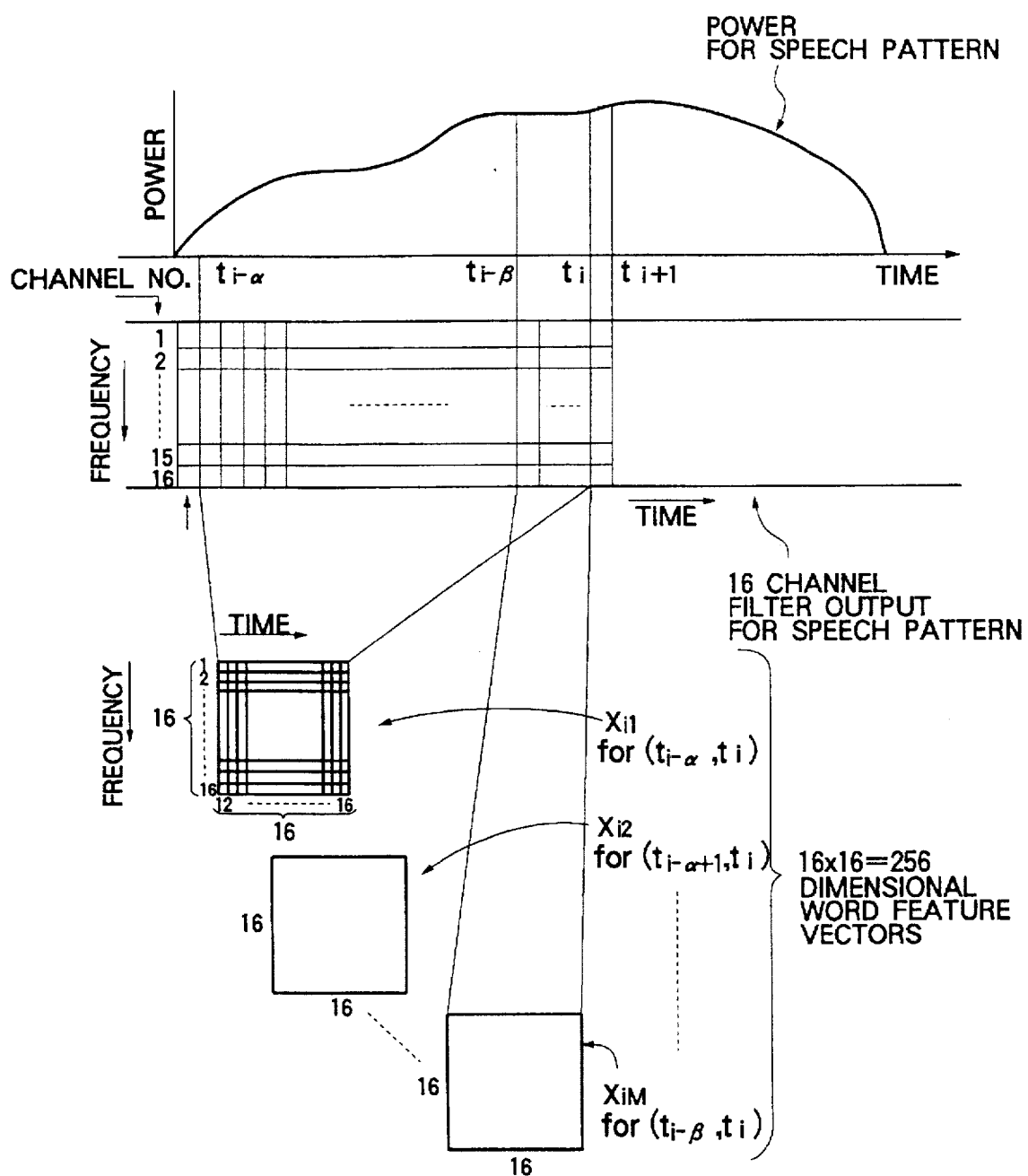
FIG. 4 is a diagrammatic illustration of input speech, speech patterns and word feature vectors utilized in the apparatus of FIG. 2, for explaining extraction of the word feature vectors.

First, the continuous pattern matching range determination unit 6A determines a range for the matching, and the candidate word feature vectors extraction unit 6B extracts a multiplicity of the candidate word feature vectors from the speech pattern represented by the filter bank output within the determined range, without fixing the word boundary. This is done, as shown in FIG. 4, by extracting a multiplicity (M in number) of candidate word feature vectors $X_{i1}$, $X_{i2}$, ..., $X_{iM}$ with each point (M points in total) between a time $t_{i-\alpha}$ and a time $t_{i-\beta}$ taken as a starting point for one ending time $t_i$. Thus, M candidate word feature vectors are extracted for each $t_i$, as a time $t_j$ progresses along the time axis. Here, each candidate word feature vector $X_{ij}$ (j=1, 2, ..., M) is obtained by sampling at 16 points along the time axis, so that each candidate word feature vector $X_{ij}$ is given as a 16 (channel)×16 (sampling)=256 dimensional vector quantity.

Then, at the pattern matching (similarity calculation) unit 6C, the similarity values are calculated for words in the speech recognition dictionary 7 and each of the extracted candidate word feature vectors $X_{ij}$. Here, as a measure of similarity, a statistical distance measure such as a multiple similarity or a Mahalanobis distance, or else a method such as a subspace method or neural network, may be utilized. In the case of a multiple similarity, a similarity value between a word l in the speech recognition dictionary 7 and a particular word feature vector $X_{ij}$ is given by the expression:

$$S_{ij}^{(l)} = \sum_{m=1}^{M} a_m^{(l)}(X_{ij}, \Phi_m^{(l)})^2$$

where $a_m^{(l)}$ is an eigenvalue for the word l, and $\Phi_m^{(l)}$ is an eigenvector for the word l.

Next, at the similarity decision unit 8, the recognition result is determined by selecting such words in the speech recognition dictionary 7 for which the similarity value is found in a prescribed time span (such as 0.3 sec for instance) to be greater than a prescribed threshold similarity value $S_T$ set to be smaller than a maximum similarity value (a maximum similarity value times 0.8, for instance) as the recognition result to be given to the recognition result output unit 9. Note that once the recognition result is obtained, the start and end points $t_i$ and $t_j$ can be ascertained as well from the i and j labels of the selected similarity value $S_{ij}^{(l)}$.

Other methods of obtaining the similarity values and determining the recognition result are also known and may be substituted for the particular ones described above.

Figure 5:
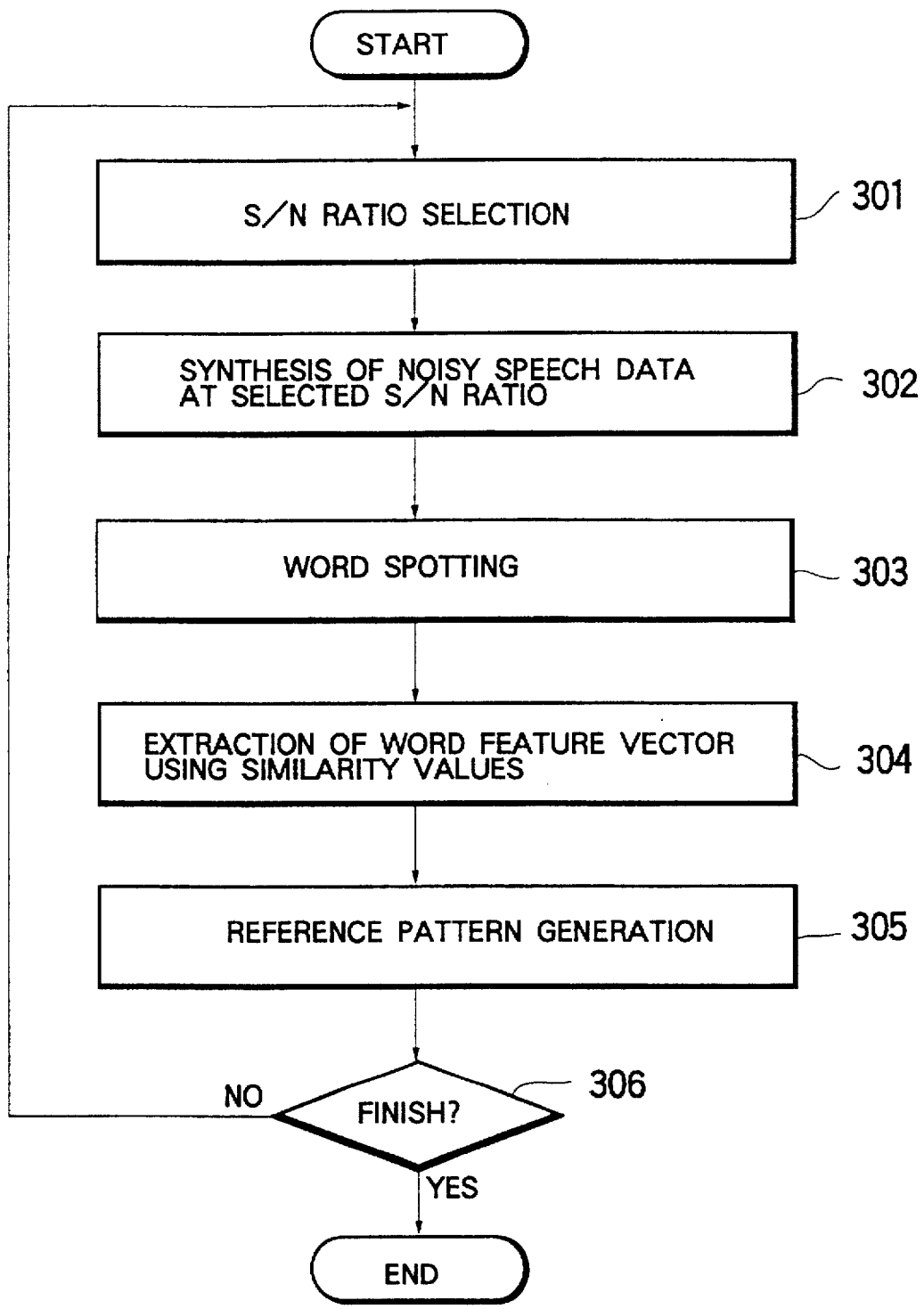
FIG. 5 is a flow chart for the learning process of the apparatus of FIG. 2.

Now, the operation of this apparatus in the learning mode will be described. In this embodiment, the operation in the learning mode is carried out according to the flow chart of FIG. 5 as follows.

Figure 6:
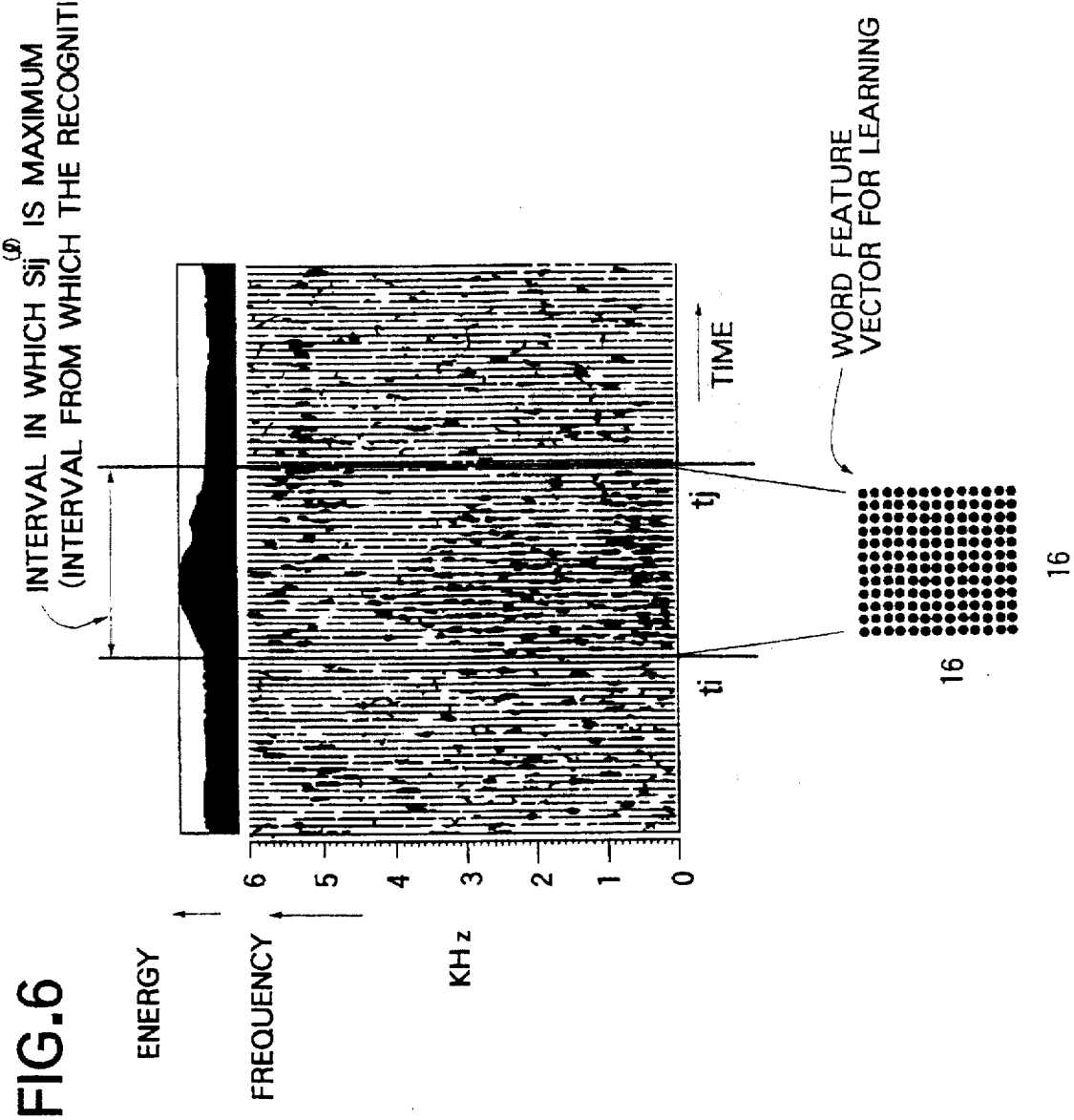
FIG. 6 is a diagrammatic illustration of speech data utilized in the apparatus of FIG. 2, for explaining the extraction of a word feature vector for learning.

In the learning mode, first a particular signal/noise ratio (S/N ratio) is selected at the noisy speech data synthesis unit 12 under control of the learning control unit 13 at the step 301, and then the noiseless speech data stored in the pure speech database 10 and the noise data stored in the noise database 11 are mixed at the speech data synthesis unit 12 at the selected signal/noise ratio at the step 302. The synthesized noisy speech data are then given to the recognition unit 2 through the spectral analysis unit 5, and subjected to the word spotting operation at the word spotting unit 6, as described above for the recognition mode. The similarity values resulting from the word spotting operation are then given to the similarity decision unit 8 as in the recognition mode, so as to determine the recognition result. The obtained recognition result is then given to the word feature vector extraction unit 14 at which the word feature vector corresponding to the similarity value of the recognition result is extracted as a word feature vector for learning, as shown in FIG. 6, at the step 304. The extracted word feature vector for learning is then given to the speech recognition dictionary learning unit 15 through the learning control unit 13 at which the reference pattern to be stored in the speech recognition dictionary 7 is obtained on a basis of the word feature vector for learning at the step 305. In a case where the multiple similarity method is used, this is done by modifying a so called covariance matrix $K^{(l)}$ for each word l according to the formula:

$$K^{(l)} = K_0^{(l)} + \alpha \Sigma X^{(l)} X^{(l)T}$$

where $K_0^{(l)}$ is an original covariance matrix before modification, $\alpha$ is a coefficient, $X^{(l)}$ is a word feature vector for learning, and $X^{(l)T}$ is a transpose of $X^{(l)}$, and then performing a so called KL expansion (principal component analysis) to obtain an eigenvector Φ for each word l. This completes one cycle of the learning process.

Figure 7:
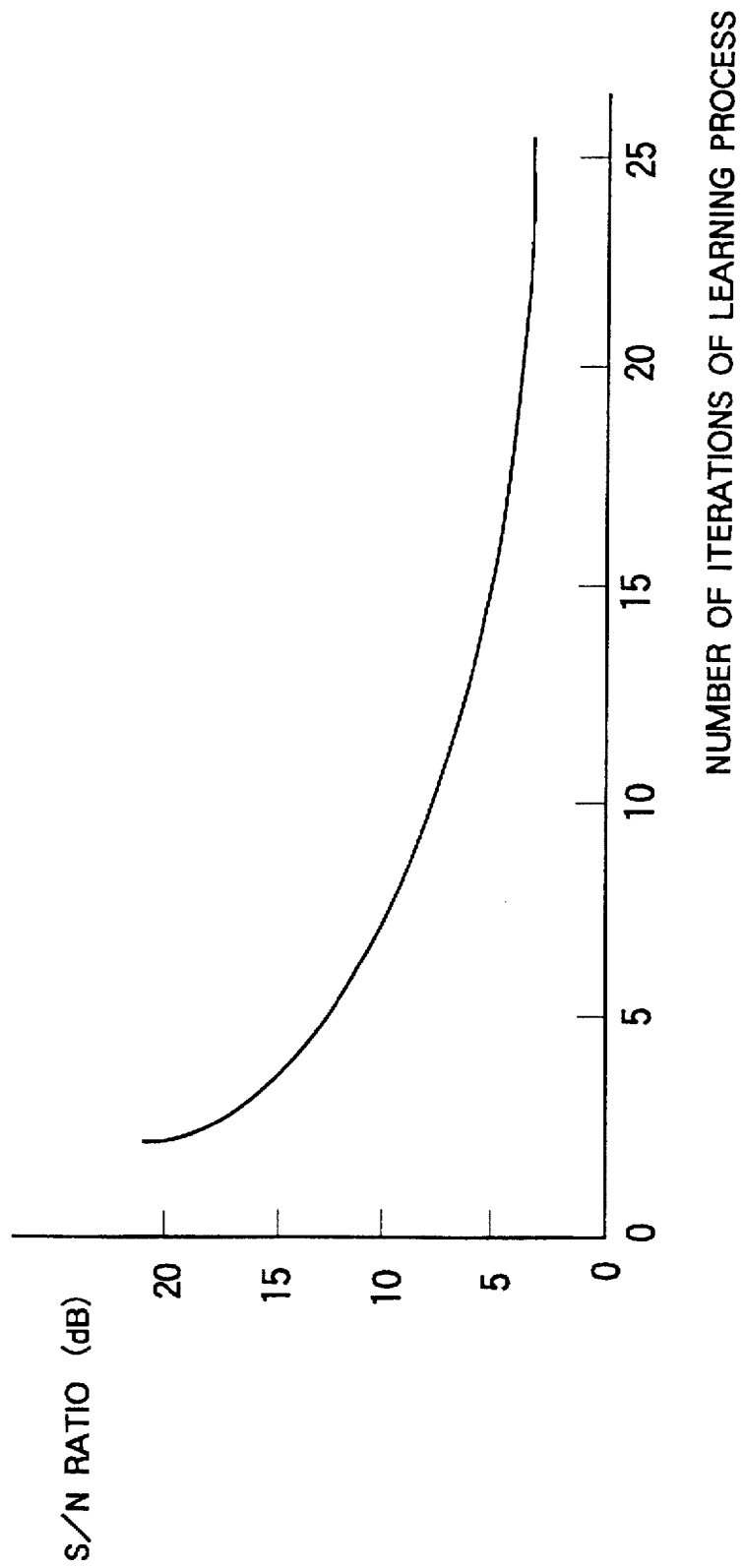
FIG. 7 is a graph of an S/N ratio with respect to a number of iterations of the learning process to be utilized by the apparatus of FIG. 2.

Now, in this embodiment, very effective improvement of the learning process can be achieved by iterating such a learning process as described above for a number of different noise levels. By such iterations with gradually varying noise levels, the determination of the word boundary can be optimized. For example, the signal/noise ratio to be selected at the first step 301 in FIG. 5 may be varied in successive iterations by gradually increasing noise levels to reduce the signal/noise ratio, such as:

S/N=∞, +40 dB, +35 dB, +30 dB, +20 dB, +15 dB, +10 dB, +8 dB, +5 dB, +3 dB, 0 dB along a curve shown in FIG. 7. Here, the first signal/noise level to be selected need not necessarily be ∞, but can be a finite value such as +20 dB. Alternatively, the noise levels may be distributed statistically around a prescribed average noise level. For this reason, there is a step 306 in the flow chart of FIG. 5, which repeats the cycle of the learning process with different noise levels until all choices are covered.

Figure 8:
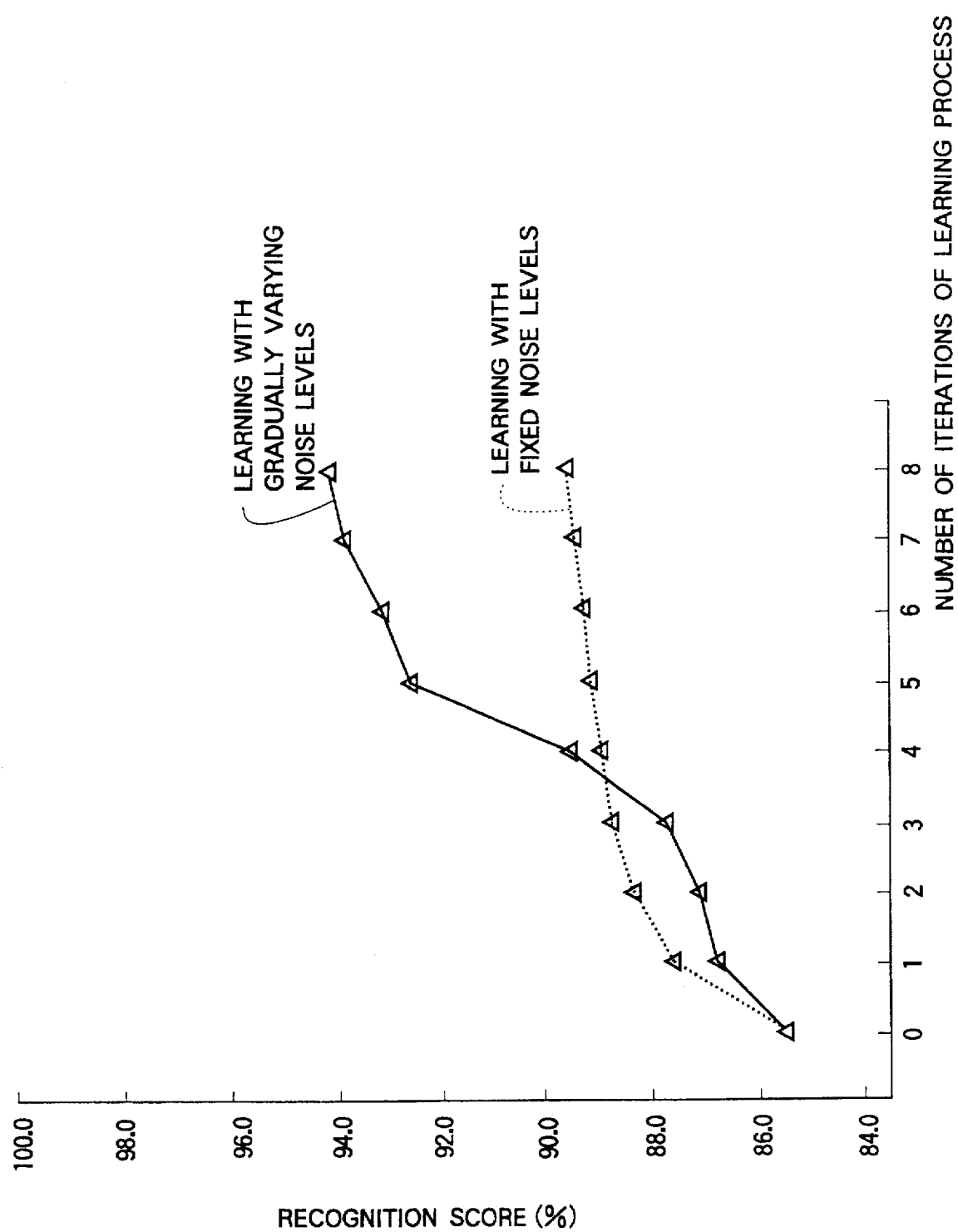
FIG. 8 is a graph showing the results of speech recognition experiments using the apparatus of FIG. 2 with iterated learning using gradually varying noise levels and fixed noise levels.

The effect of such iterations with gradually varying noise levels can be seen from the results of speech recognition experiments performed by the apparatus of this embodiment using iterated learning with gradually varying noise levels and with fixed noise levels shown in FIG. 8. As shown, the recognition score improves much faster for iterated learning with gradually varying noise levels, such that after 8 iterations, there is a 4.6% difference between the iterated learning with gradually varying noise levels and with fixed noise levels.

Thus, in this embodiment, the word feature vector for learning as well as the start and end points of the speech pattern can automatically be determined by subjecting the artificially synthesized noisy speech data to the word spotting method of speech recognition, so that it is possible to realize a so called "noise immune" system of learning in which the variations of the speech pattern due to noise are completely taken into account in the process of learning, which in turn assures highly accurate performance of the apparatus in the speech recognition mode of operation. The use of a statistical distance measure such as the multiple similarity method is preferable in this regard, as various types of noises can be dealt with by changing the statistical distribution of the noise levels in the successively iterated learning processes. The iterated learning with gradually varying noise levels is particularly effective in this embodiment.

Moreover, the present invention is particularly effective when learning is conducted in real time at an actual location of the apparatus. That is, noise data may be taken directly from the actual environment in which the apparatus is used, instead of artificially prepared noise data in the noise database, and the learning may be carried out in real time as the noise data are collected, so that the system can reflect the actual environmental conditions surrounding the apparatus. To facilitate such real time learning, a rather large amount of calculations are necessary for signal processing, word spotting, KL expansion etc., but this can be accommodated by utilizing highly advanced recent vector processors and parallel processors.

It is to be noted that when the statistical distance measure other than the multiple similarity such as the Mahalanobis distance, maximum likelihood method, subspace method, or neural network is utilized, the details of the recognition and learning processes as described above for the multiple similarity have to be modified accordingly. However, regardless of the statistical distance measure utilized, the present invention can effectively be adapted by subjecting the artificially synthesized noisy speech data to the word spotting like method of speech recognition in which the word boundary is unfixed, in order to obtain word feature vectors for learning, and by iterating such a learning process for a number of different noise levels in order to optimize the determination of the word boundary.

It is also to be noted that the present invention may be adapted to deal with the variations of the speech pattern other than those due to external noises as described above, such as those of level fluctuation, or deformation due to communication lines or communication equipment.

It is further to be noted that the present invention may be adapted to deal with speech data of a particular designated speaker alone, in which the speech data of the other speakers will not be recognizable.

It is also to be noted that the speech recognition apparatus of the present invention may also be utilized to obtain raw data for further post processing and language processing in which the recognition result as well as the start and end points of the recognition result are utilized, such as recognitions of word sequences or speech sequences.

Also, in addition to the learning process of the above embodiment, it is beneficial to additionally perform learning in the manner of so called competitive learning in which the covariance matrix $K^{(m)}$ for each word m is subjected to additional modification according to the formula:

$$K^{(m)} = K_\theta^{(m)} - \beta \Sigma X^{(l)} X^{(l)T}, (m \neq l)$$

where $K_\theta^{(m)}$ is an original covariance matrix before this modification, β is another coefficient, $X^{(l)}$ is a word feature vector for learning for a word l, and $X^{(l)T}$ is a transpose of $X^{(l)}$.

Furthermore, the word sequence recognition or speech sequence recognition can also be performed in the present invention in addition to the word recognition described above.

Moreover, the present invention can be adapted to deal with recognition of time series signals other than speech signals, such as the acoustic signals or vibrational signals, in general. More specifically, such diverse applications of the present invention as the detection of the acoustic vibrational signals due to a malfunctioning ball bearing, the detection of an abnormal engine noise, speaker matching, speaker identification, the recognition of sound of a cannon firing, a seismometer, a fire detection sensor etc. can easily be envisaged.

Now, in general, the background noise under the actual environment is going to be non-stationary noise whose frequency components change from time to time. Consequently, the frequency pattern of the noise data stored in the noise database 11 may deviate from the frequency pattern of the actual noise at a time of actually using the speech recognition apparatus. As a result, even when the noise immune learning system of the foregoing embodiment is employed, the learning of the recognition dictionary using the noise data acquired in advance cannot sufficiently account for the pattern variation of the actual noise at a time of using the speech recognition apparatus. In particular, when the S/N ratio is low, the recognition performance becomes rather poor even in the noise immune learning system.

In order to resolve this problem, it is possible to further modify the foregoing embodiment as in the following second embodiment of a time series recognition apparatus according to the present invention in a form of the speech recognition apparatus, in which the the background noise data are constantly acquired, and the learning of the recognition dictionary is carried out by using the noise data acquired immediately before the speech input is made by the user, so as to realize the high performance speech recognition apparatus which is stably operable with respect to the pattern variation of the noise depending on the environment or the time of the apparatus use.

Figure 9:
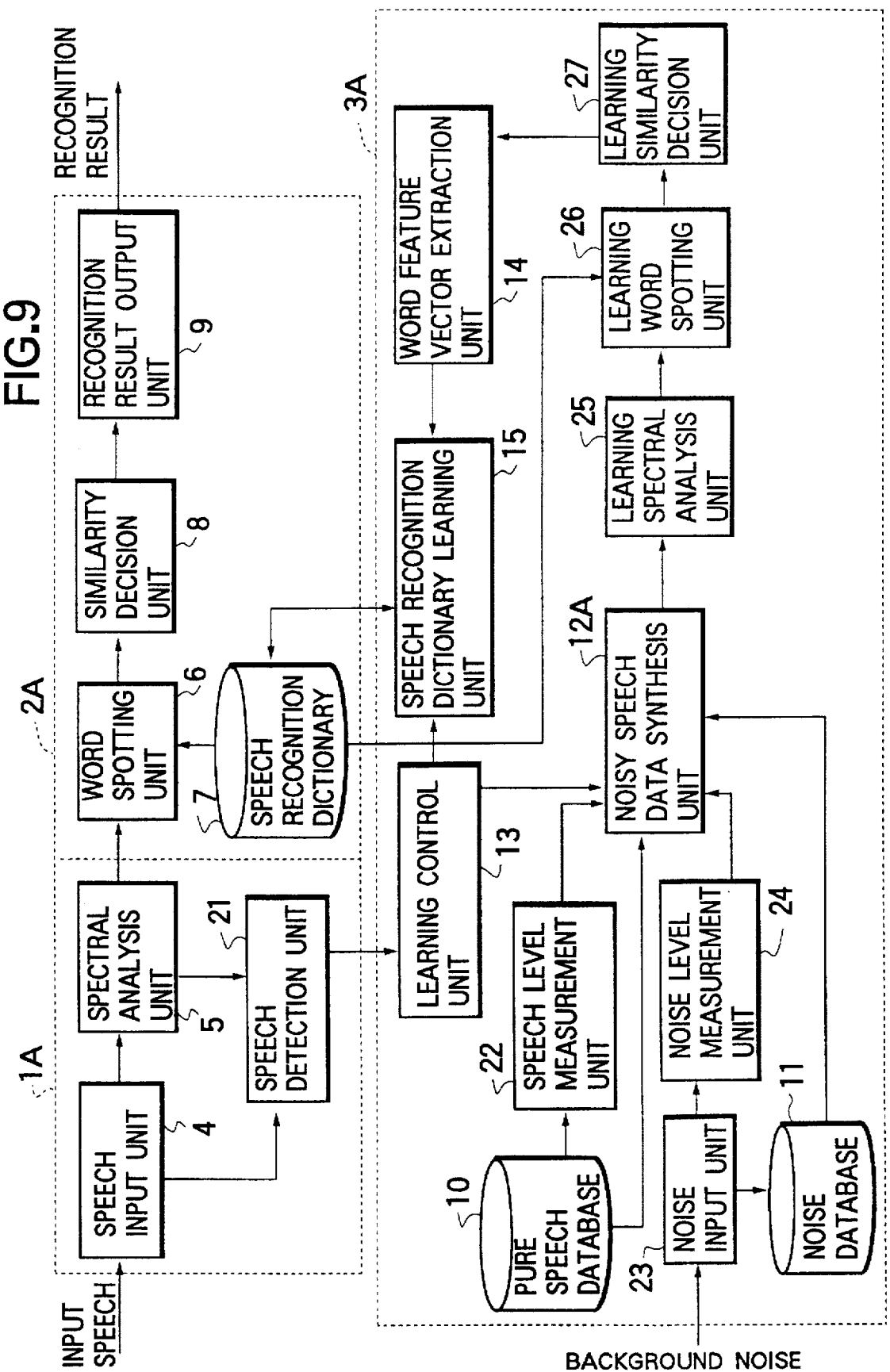
FIG. 9 is a block diagram for a second embodiment of a time series recognition apparatus according to the present invention.

Namely, in this second embodiment as shown in FIG. 9, the apparatus generally comprises a speech pattern extraction unit 1A, a recognition unit 2A, and a learning unit 3A, and operates in the two operational modes, one being a speech recognition mode and one being a learning mode.

The speech pattern extraction unit 1A comprises the speech input unit 4 and the spectral analysis unit 5 similar to those in the configuration of FIG. 2, and a speech detection unit 21 for detecting speech sections in the input speech received by the speech input unit 4 according to the spectral analysis result obtained by the spectral analysis unit 5. The speech sections detected by this speech detection unit 21 are then supplied to the learning control unit 13 in the learning unit 3A.

The recognition unit 2A comprises the word spotting unit 6, the speech recognition dictionary 7, the similarity decision unit 8, and the recognition result output unit 9 similar to those in the configuration of FIG. 2, except that the reference patterns in the speech recognition dictionary 7 are available not only to the word spotting unit 6, but also to a learning word spotting unit 26 in the learning unit 3A to be described below, and that the output of the similarity decision unit 8 is not supplied to the word feature vector extraction unit 14 in the learning unit 3A.

The learning unit 3A, which is utilized in the learning mode only, includes the pure speech database 10, the noise database 11, the learning control unit 13, the word feature vector extraction unit 14, and the speech recognition dictionary learning unit 15 similar to those in the configuration of FIG. 2. In addition, this learning unit 3A further includes a speech level measurement unit 22 for measuring a speech power level of the noiseless speech data for learning stored in the pure speech database 10, a noise input unit 23 for entering the background noise of the apparatus into the noise database 11, a noise level measurement unit 24 for measuring a noise power level of the background noise entered by the noise input unit 23, and a noisy speech data synthesis unit 12A for mixing the noiseless speech data and the noise data supplied from the pure speech database 10 and the noise database 11 to obtain leaning speech data according to the speech power level and the noise power level measured by the speech level measurement unit 22 and the noise level measurement unit 24 under the control of the learning control unit 13.

Figure 10:
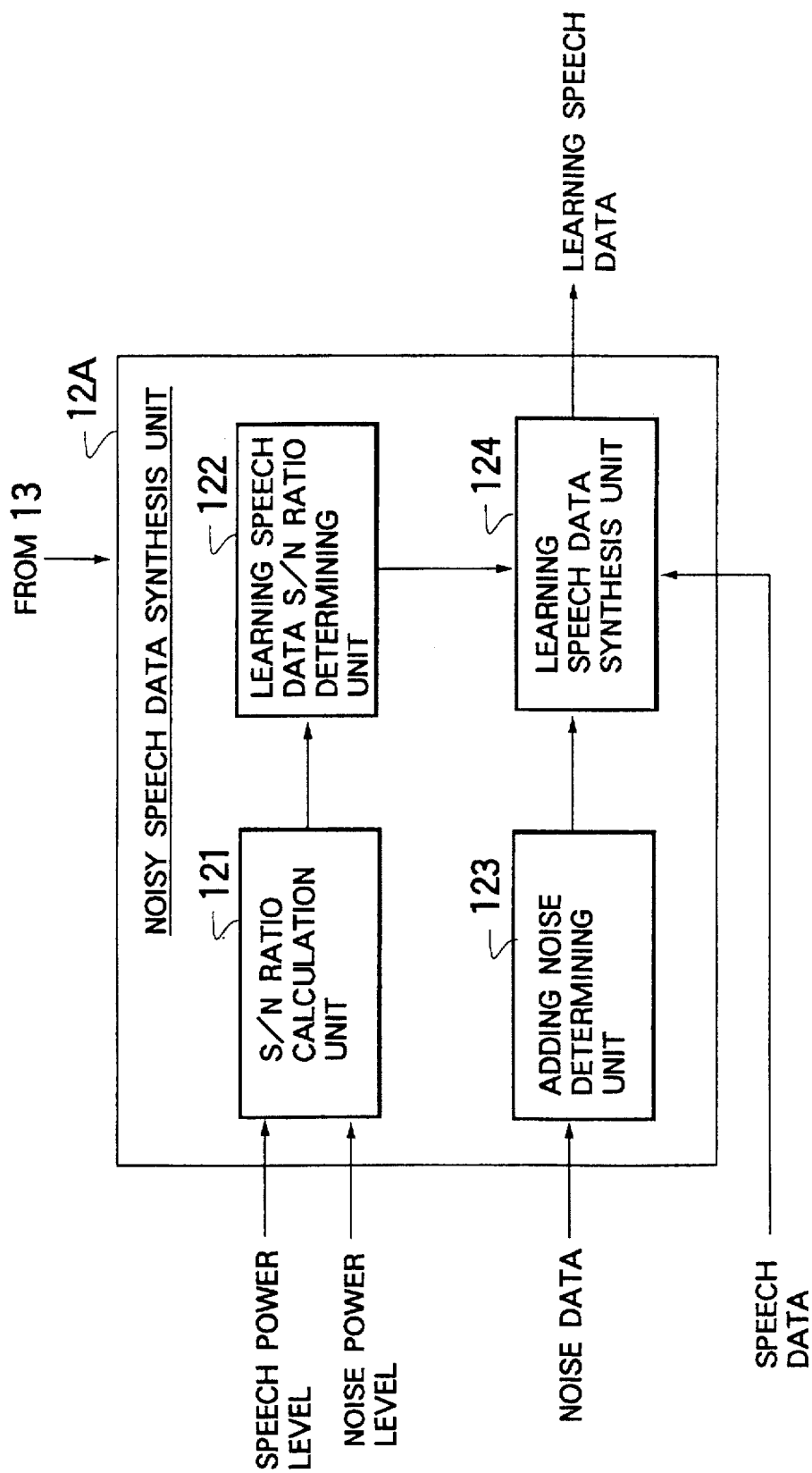
FIG. 10 is a block diagram for a noisy speech data synthesis unit in the apparatus of FIG. 9.

Here, as shown in FIG. 10, the noisy speech data synthesis unit 12A comprises an S/N ratio calculation unit 121 for calculating an S/N ratio from the speech power level and the noise power level measured by the speech level measurement unit 22 and the noise level measurement unit 24, a learning speech data S/N ratio determining unit 122 for determining a learning speech data S/N ratio, an adding noise determining unit 123 for determining an adding noise, and a learning speech data synthesis unit 124 for synthesizing the learning speech data from the noiseless speech data supplied from the pure speech database 10 and the adding noise determined by the adding noise determining unit 123 at the learning speech data S/N ratio determined by the learning speech data SIN ratio determining unit 124.

Moreover, this learning unit 3A further includes a learning spectral analysis unit 25 for analyzing the spectrum of the learning speech data obtained by the noisy speech data synthesis unit 12A to extract parametrized speech patterns for learning, a learning word spotting unit 26 for obtaining word feature vectors for learning from the extracted speech patterns for learning and making matchings of the obtained word feature vectors for learning with the reference patterns in the speech recognition unit 7 by calculating the similarity values for the obtained word feature vectors for learning, and a learning similarity decision unit 27 for determining a recognition result for learning in accordance with the matching made at the learning word spotting unit 26. In this second embodiment, the output of this learning similarity decision unit 27 is supplied to the word feature vector extraction unit 14, while the output of the word feature vector extraction unit 14 is directly supplied to the speech recognition dictionary learning unit 15.

The function of each element enumerated above will become apparent from the following description of the speech recognition and learning modes of operations of the apparatus.

In the speech recognition mode, the operation of this second embodiment is substantially similar to that in the embodiment of FIG. 2 described above. Namely, at the speech input unit 4 and the spectral analysis unit 5, the input speech are processed just as in the embodiment of FIG. 2, and at the recognition unit 2A, matching between the reference patterns in the speech recognition dictionary 7 and the word feature vectors is made in the manner substantially similar to that in the recognition unit 2 of FIG. 2 described above.

Figure 11:
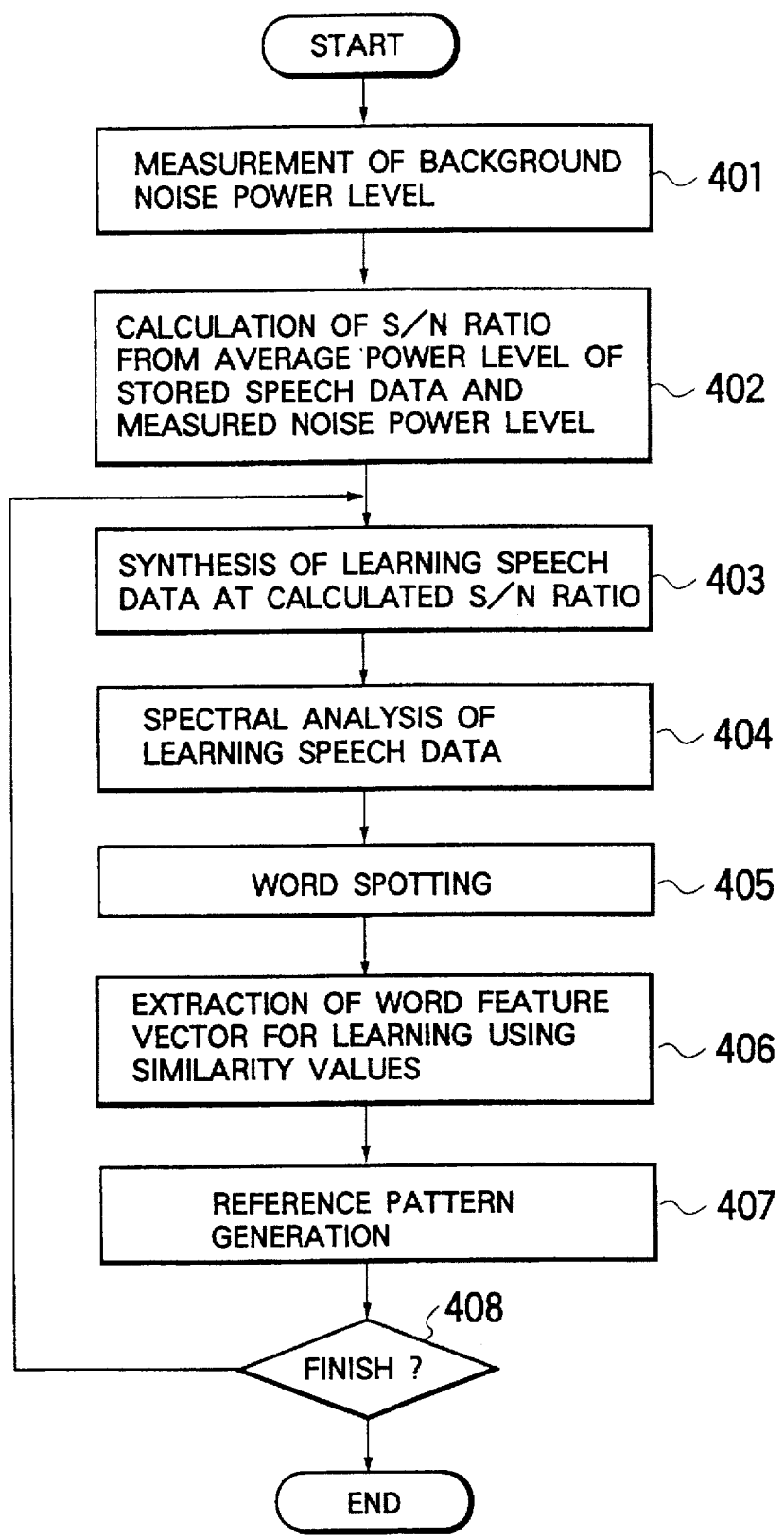
FIG. 11 is a flow chart for the learning process of the apparatus of FIG. 9.

On the other hand, the operation in the learning mode is different from that in the embodiment of FIG. 2, and will be carried out according to the flow chart of FIG. 11 as follows.

In the learning mode, the learning speech data are artificially synthesized by using the noiseless speech data in the pure speech database 10 and the noise data in the noise database 11, and here the noise data are not those which have been acquired prior to the actual use of the apparatus as in the foregoing embodiment of FIG. 2, but the background noises in the actual environment in which the apparatus is actually used which are constantly acquired through a microphone (not shown) in an on-line manner. By using the noise data so acquired in the on-line manner for the purpose of learning, it becomes possible in this second embodiment to account for the non-stationary components of the background noises in the recognition dictionary.

When the background noises in the environment of the actual apparatus use are entered from the noise input unit 23, the noise data representing these background noises are stored in the noise database 11, while the power level of the background noises is measured at the noise level measurement unit 24 (step 401). Here, the noise data are stored in the noise database 11 in units of prescribed fixed lengths, and those noise data which have been stored over a prescribed period of time are discarded sequentially.

On the other hand, the noiseless speech data stored in the pure speech database 10 are entered into the speech level measurement unit 22 which calculates the average power level for each word in the noiseless speech data. Then, the noiseless speech data and the noise data are entered into the noisy speech data synthesis unit 12A along with their power level values, at which the S/N ratio for the learning speech data are calculated (step 402) and the learning speech data at the calculated S/N ratio are synthesized (step 403).

Figure 12:
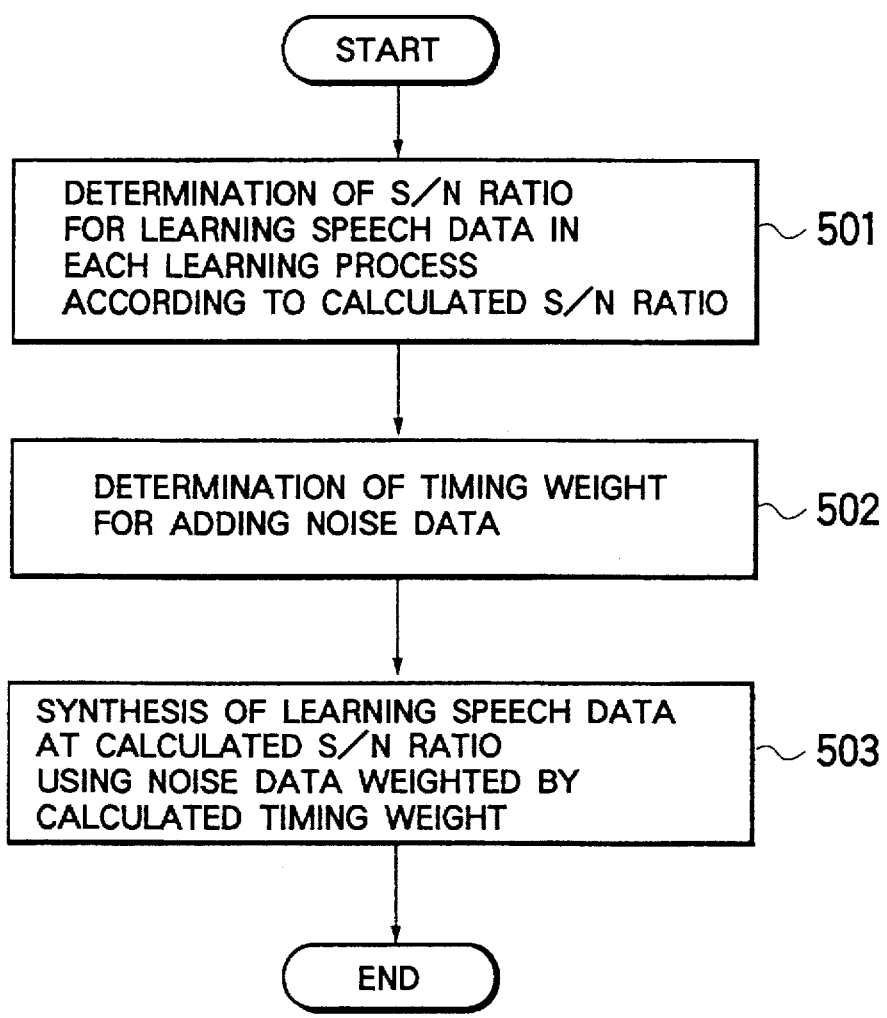
FIG. 12 is a flow chart for the operation of the noisy speech data synthesis unit of FIG. 10 in the learning process of the apparatus of FIG. 9.

More specifically, the noisy speech data synthesis unit 12A operates according to the flow chart of FIG. 12 as follows.

First, at the S/N ratio calculation unit 121, the S/N ratio of each word in the actual environment with noises is calculated according to the speech power level for each word and the noise power level supplied from the speech level measurement unit 22 and the noise level measurement unit 24.

Then, the SIN ratio for the learning speech data in each learning process is determined by the learning speech data S/N ratio determining unit 122 (step 501).

Figure 13:
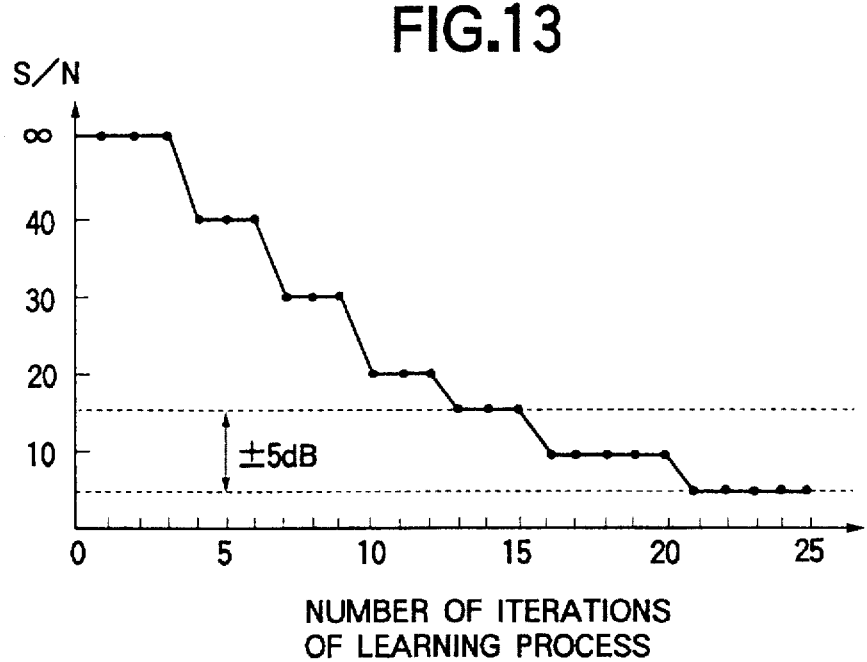
FIG. 13 is a graph of an S/N ratio with respect to a number of iterations of the learning process to be utilized by the apparatus of FIG. 9.

Here, when the S/N ratio calculated for a particular word by the S/N ratio calculation unit 121 is assumed to be 10 dB for the sake of definiteness, the S/N ratio for the learning speech data in each learning process can be determined as shown in FIG. 13 for example. Namely, the learning of the recognition dictionary is carried out by the noise immune learning as described in the foregoing embodiment of FIG. 2, in which the S/N ratio for the learning speech data is gradually reduced as the learning progresses in order to raise the reliability of the recognition dictionary by improving the accuracy in the extraction of the word feature vector for learning. Here, the manner of reducing the S/N ratio for the learning speech data is adjusted such that the recognition performance can be improved most effectively for the speech data from which the S/N ratio for the particular word has been calculated by the S/N ratio calculation unit 121.

FIG. 13 shows an exemplary manner for reducing the S/N ratio in a case the S/N ratio for the particular word calculated by the S/N ratio calculation unit 121 is 10 dB as assumed above. In this case, the learning process is iterated for three times in each case of S/N ratio=∞, S/N=40 dB, S/N ratio=30 dB, S/N ratio=20 dB, and S/N ratio=15 dB, while the learning process is iterated for five times in each case of S/N ratio=10 dB and S/N ratio=5 dB, such that the learning speech data with the S/N ratio in vicinity of 10 dB are relatively heavily weighted in the learning. In other words, the improvement of the recognition accuracy with respect to the input speech is realized by carrying out the learning in which the learning speech data with the S/N ratio in vicinity of the S/N ratio of the particular word calculated by the S/N ratio calculation unit 121 are weighted relatively heavily.

It is to be noted here that the relationship between the S/N ratio and the number of iterations of the learning process as indicated in FIG. 13 is only an example among many possible choices. In essence, the effectiveness of this second embodiment lies in producing the recognition dictionary capable of achieving the high recognition performance in the state having the S/N ratio similar to that in the actual environment of the apparatus use by using the speech data in the vicinity of the calculated S/N ratio most intensively in the learning while gradually reducing the S/N ratio.

Figure 14:
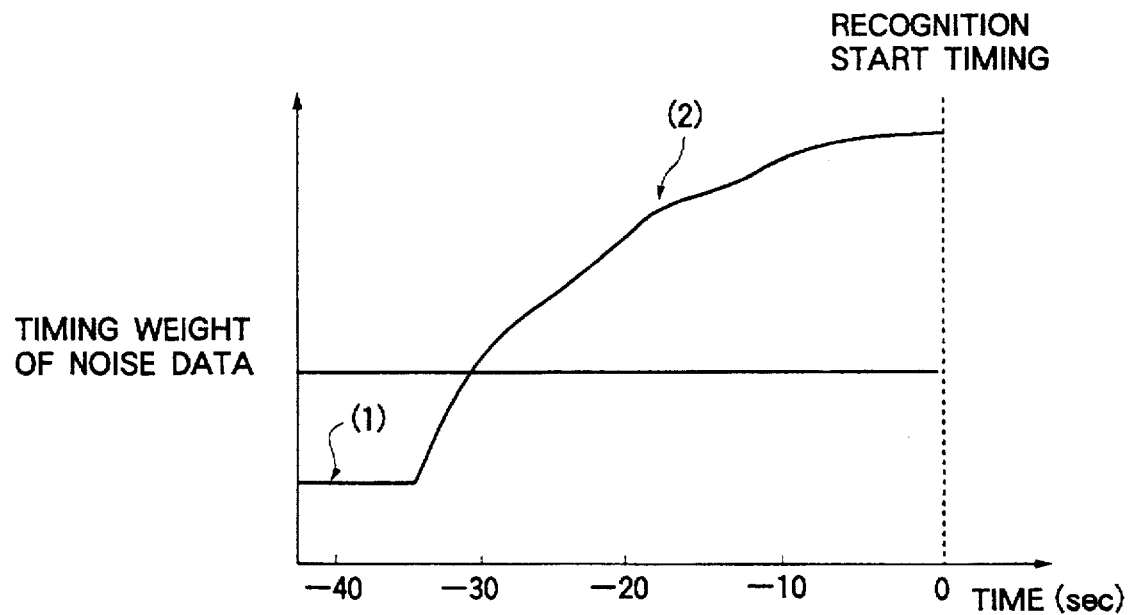
FIG. 14 is a graph of a timing weight of noise data with respect to time to be utilized in the learning process of the apparatus of FIG. 9.
Figure 15:
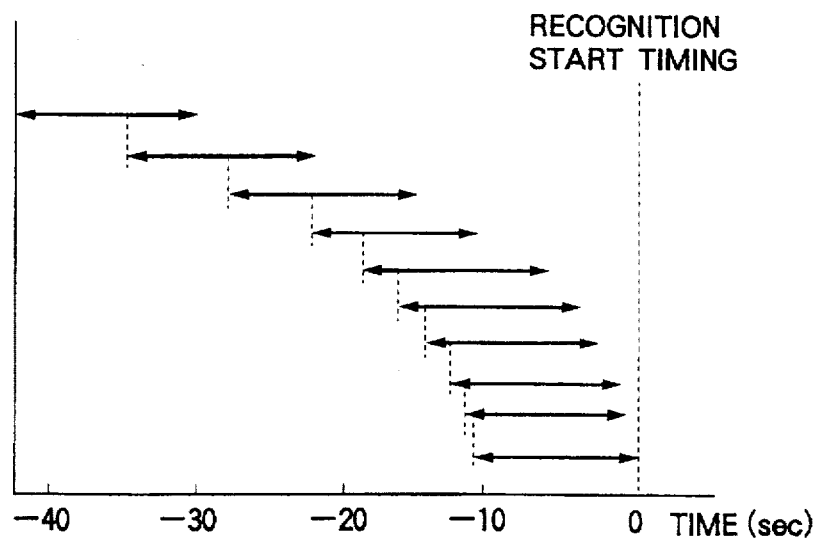
FIG. 15 is a diagram indicating timing zones from which the noise data are acquired in the learning process of the apparatus of FIG. 9.

Next, the timing weight for adding the noise data in the learning speech data is determined by the adding noise determining unit 123 (step 502) as indicated by a part (2) of FIG. 14. Namely, the weight for adding the noise data is gradually changed for different recognition timings, so as to produce the recognition dictionary capable of achieving the high recognition performance. Here, taking a timing for entering the input speech as a reference timing, the noise data acquired up to that reference timing are going to be used in the learning, with the noise data acquired at timings closer to the reference timing being weighted more heavily, and the noise data acquired at timings farther from the reference timing being weighted less heavily. In this manner, it becomes possible to reflect the noise data of the timings closer to the recognition start timing more intensively in the recognition dictionary, so as to improve the recognition performance. In this case, the noise data to be included in the learning speech data are those acquired at the timing zones as indicated in FIG. 15, in which the adjacent timing zones are separated by an increasingly shorter time interval as the recognition start timing approaches, such that the noise data at the timing closer to the recognition start timing are used more intensively in the learning.

Here, it is to be noted that the recognition start timing can be determined as a timing for sensing the approach of the user toward the microphone for entering the input speech by using a distance sensor attached to the microphone, or as a timing for sensing the stepping of the user on a mat equipped with a pressure sensor which is placed in front of the apparatus. Alternatively, the recognition start timing may be a timing at which the entering of the input speech is judged by carrying out the boundary detection of the input speech based on the power level data or the frequency analysis result of the input speech before the word spotting operation.

Then, the learning speech data are synthesized by the learning speech data synthesis unit 124 (step 503), while controlling the learning speech data S/N ratio and the timing weight for adding the noise data as described above.

The learning speech data obtained by the noisy speech data synthesis unit 12A are then supplied to the learning spectral analysis unit 25 which analyzes the spectrum of the learning speech data obtained by the noisy speech data synthesis unit 12A to extract parametrized speech patterns for learning (step 404), and the extracted speech patterns for learning are supplied to the word spotting unit 26 which obtains word feature vectors for learning from the extracted speech patterns for learning and makes matchings of the obtained word feature vectors for learning with the reference patterns in the speech recognition unit 7 by calculating the similarity values for the obtained word feature vectors for learning (step 405).

Then, the calculated similarity values are supplied to the learning similarity decision unit 27 which determines a recognition result for learning in accordance with the matching made at the learning word spotting unit 26, in accordance with which the word feature vector extraction unit 14 obtains the word feature vector of the maximum similarity value as a word feature vector for learning (step 406), and the speech recognition dictionary learning unit 15 obtains a reference pattern to be stored in the speech recognition dictionary 7 from the word feature vector of the maximum similarity value obtained by the word feature vector extraction unit 14 (step 407), just as in the embodiment of FIG. 2 described above. In a case of using the multiple similarity method, this operation to obtain the reference pattern includes the updating of the covariance matrix for each word, and the KL expansion (principal component analysis) to obtain the eigenvector for each word. The learning process between the steps 403 and 407 described above is then iterated for as many times as required (step 408).

In this second embodiment, the learning mode operation described above is carried out whenever the recognition start timing is detected.

Thus, according to this second embodiment, the recognition dictionary can be automatically designed to reflect the actual environment in which the apparatus is actually used for a considerable advantage.

Up to now, this second embodiment has been described for a case in which the apparatus operates in the recognition mode and the learning mode separately. In the following, a case in which the apparatus of this second embodiment constantly operates in both of the recognition mode and the learning mode will be described.

In this case, the input speech is constantly entered at the speech pattern extraction unit 1A, and the operation in the recognition mode as described above is carried out at the recognition unit 2A.

On the other hand, in the speech pattern extraction unit 1A, the input speech start timing is detected by the speech detection unit 21 by using the input speech power or the spectral analysis result for example. When the input speech start timing is detected, this is notified to the learning control unit 13 in the learning unit 3A such that the synthesis of the learning speech data by controlling the level of utilization of the noise data as described above is carried out and the learning of the speech recognition is performed.

In addition, even when the input speech start timing is not detected, the operation in the learning mode is carried out. In such a case, the timing weight for adding the noise data used at the noisy speech data synthesis unit 12A is as indicated by a part (1) in FIG. 14. Namely, the noise data acquired at a constant rate regardless of timings are used for producing the learning speech data, and the learning based on such learning speech data is carried out to account for the pattern variations of the acquired noise data.

Then, when the input speech start timing is detected, the operation in the learning mode is continued in the real time manner, and the result of the learning is utilized in the operation in the recognition mode. Here, the reference patterns in the speech recognition dictionary 7 are updated by the new reference patterns obtained by the learning, after the input speech start timing is detected by the speech detection unit 21 and before the word spotting operation at the word spotting unit 6, such that the word spotting operation is carried out with the new reference patterns.

Under the actual noisy environment, the above described operation of the learning mode in the real time manner requires a large amount of calculations for the spectral analysis, the word spotting, the KL expansion, etc., which can be handled by parallel computers.

Figure 16:
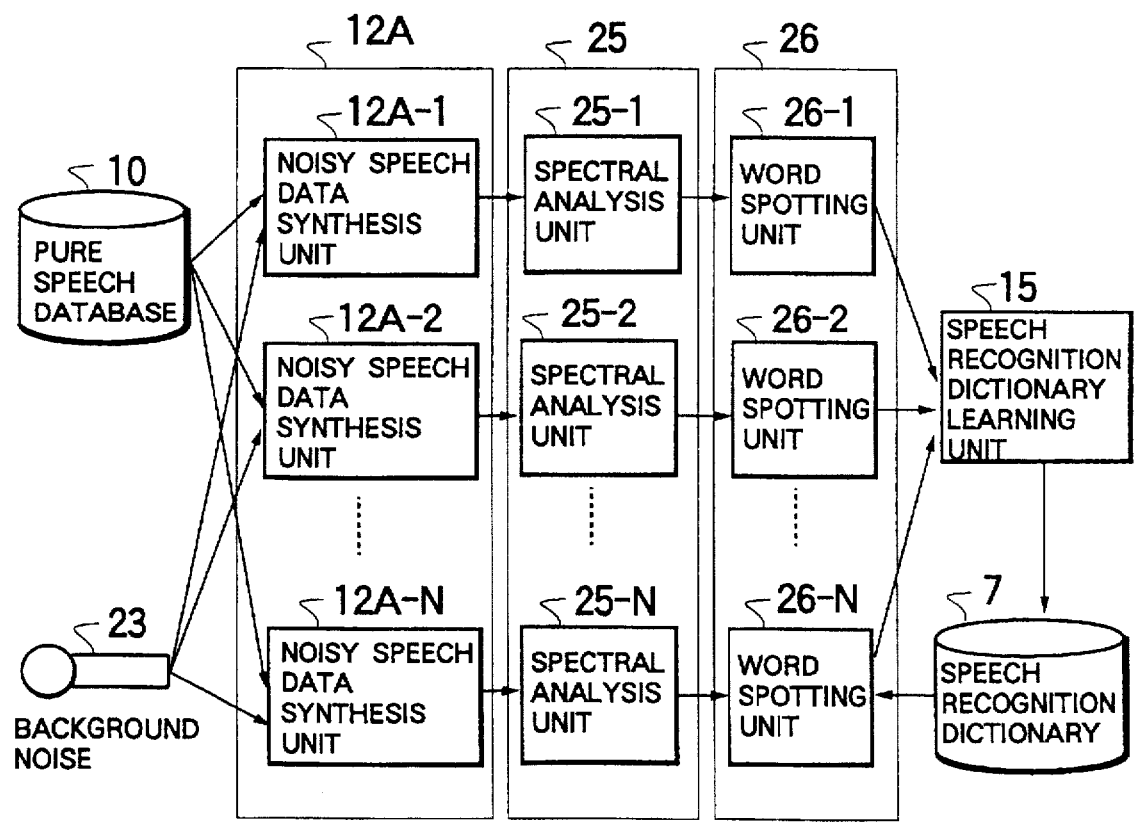
FIG. 16 is a schematic block diagram showing a configuration for a part of the apparatus of FIG. 9 in a case of using the parallel processing in the learning process.

Namely, as shown in FIG. 16, the operation for synthesizing the learning speech data at the noisy speech data synthesis unit 12A can be carried out for each speech data independently in parallel by using parallelly provided independent noisy speech data synthesis units 12A-1 to 12A-N, and the spectral analysis at the spectral analysis unit 25 can be carried out for each speech data independently in parallel by using parallelly provided independent spectral analysis units 25-1 to 25-N. Similarly, the word spotting at the word spotting unit 26 can be carried out for each word feature vector independently in parallel by using parallelly provided independent word spotting units 26-1 t 26-N.

In a case of utilizing the parallel processing in this manner, the processing time becomes as follows. Namely, by ignoring the time required for the learning speech data synthesis and the spectral analysis for one speech data as negligibly short compared to that required for the word spotting operation, the order of the processing time is O(M) in a case of utilizing the parallel processing, whereas the order of the processing time is O(N.P.M) where M is a time required for calculating the similarity value for one word feature vector, N is a number of learning speech data, and P is a number of word feature vectors involved in calculating the similarity values for the word spotting of one data.

Therefore, when N is 10,000 and P is 1,000 for example, the processing time can be reduced to approximately 1/10,000,000 by completely parallel processing all of the learning speech data synthesis, the spectral analysis, and the word spotting. This implies that the learning process which used to require 5 days (432,000 seconds) can be completed within 0.0432 second, so that the learning in the real time manner at the recognition start timing can be realized by utilizing the parallel processing.

As described, according to this second embodiment, it becomes possible to provide a method and an apparatus for time series signal recognition capable of obtaining a high recognition rate even for the speech data with low S/N ratio by carrying out the learning of the recognition dictionary to account for the pattern variation due to the background noises depending on the location and time of the actual apparatus use.

It is to be noted that in a case where the environment to use the apparatus can be expected to change among several environments, it is also possible to prepare the recognition dictionary suitable for each possible environment in advance and to carry out the learning based on the recognition dictionary suitable for the actual environment at a time of the actual use of the apparatus. Similarly, even under the same environment, in a case the noise pattern can be expected to change depending on the time of the actual use, it is also possible to prepare the recognition dictionary suitable for each possible time to use the apparatus in advance and to carry out the learning based on the recognition dictionary suitable for the actual time for using the apparatus.

As for the style of using the apparatus, it is possible to provide the apparatus in such a form that the user is required to handle a terminal device capable transmitting the input speech data and the background noise data acquired by the microphone via radio to a separate central parallel processing unit which carries out the actual recognition and learning. Alternatively, in a case where it becomes possible to provide the high speed parallel processing device in a sufficiently compact size, the central parallel processing unit may be integrally incorporated into the terminal device to be handled by the user.

It is also to be noted that the above embodiments have been described for a case of dealing with an unspecified speaker, but the present invention is equally applicable to a case of dealing with a specific speaker. In such a case, the learning can be carried out by using only the speech data of the specific speaker among the noiseless speech data acquired in advance in the pure speech database, or by using the input speech uttered by the specific user at a time of the recognition.

It is further to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An apparatus for time series signal recognition, comprising:

means for inputting input signal patterns for time series signals to be recognized;

means for recognizing the time series signals according to a word spotting scheme using continuous pattern matching, including:

recognition dictionary means for storing reference patterns with which an individual one of the time series signals is to be matched;

wherein the means for recognizing executes the steps of:
(1) setting an ending time for the individual one of the time series signals;
(2) setting an adjustable starting time for the individual one of the time series signals;
(3) extracting a candidate feature vector for the individual one of the time series signals, the extraction being performed between the adjustable starting time and the ending time of the time series signals;

(4) determining a maximum similarity value for the candidate feature vector as compared with each of the reference patterns stored in the recognition dictionary;

(5) if the maximum similarity value exceeds a threshold level, determining a word within the adjustable starting time and the ending time based on the corresponding reference pattern having the maximum similarity value;:

(6) if the maximum similarity value does not exceed the threshold level and if the adjustable starting time is greater than a prescribed amount of time before the ending time, setting a new adjustable starting time that is closer in time to the ending time than a previous adjustable starting time, and returning to the step (1); and (7) if the maximum similarity value does not exceed the threshold level and if the adjustable starting time is not greater than the prescribed amount of time before the ending time, setting the new adjustable starting time as the ending time and setting a new ending time that is a second prescribed amount of time after the new adjustable starting time, and returning to the step (1); and means for learning new reference patterns to be stored in the recognition dictionary means, including:

means for acquiring actual background noise of the apparatus;

means for mixing prescribed noiseless signal patterns with the actual background noise acquired by the acquiring means to form signal patterns for learning;

learning recognition means for recognizing the signal patterns for learning by extracting feature vectors for learning from the signal patterns for learning; and means for obtaining the new reference patterns from the feature vectors for learning extracted by the learning recognition means and storing the obtained new reference patterns in the recognition dictionary means.

2. The apparatus of claim 1, wherein learning by the learning means is iterated for a number of different noise levels for the actual background noise mixed with the prescribed noiseless signal patterns.

3. The apparatus of claim 2, wherein the number of different noise levels are derived by lessening a difference in noise level of the actual background noise for each successive iteration.

4. The apparatus of claim 2, wherein the number of different noise levels are derived by statistically distributing various noise levels for the actual background noise.

5. The apparatus of claim 2, wherein the number of different noise levels are derived such that a signal-to-noise (S/N) ratio of the signal patterns for learning is gradually reduced to a vicinity of an S/N ratio given by the prescribed noiseless signal patterns and the actual background noise as the learning by the learning means progresses.

6. The apparatus of claim 1, wherein the acquiring means acquires the actual background noise of an environment of the inputting means up to a timing for starting a recognition of the input signal patterns by the recognizing means.

7. The apparatus of claim 1, wherein the mixing means forms the signal patterns for learning from the prescribed noiseless signal patterns by parallel processing, and the learning recognition means recognizes the signal patterns for learning by parallel processing.

8. The apparatus of claim 7, wherein a plurality of different levels of the actual background noise are mixed with the prescribed noiseless signal concurrently by parallel processing, so as to concurrently form the signal patterns for learning for a plurality of different signal-to-noise (S/N) levels.

9. An apparatus for time series signal recognition, comprising:

means for inputting input signal patterns for time series signals to be recognized;

means for recognizing the time series signals according to a word spotting scheme using continuous pattern matching, including:

means for extracting a plurality of candidate feature vectors for characterizing an individual time series signal from the input signal patterns;

recognition dictionary means for storing reference patterns with which the individual time series signal is to be matched;

means for calculating similarity values for each of the extracted candidate feature vectors and the reference patterns; and means for determining a recognition result by selecting one of the stored reference patterns that matches with one of the extracted candidate feature vectors by the continuous pattern matching for which the similarity value calculated by the calculating means is greater than a prescribed threshold value; and means for learning new reference patterns to be stored in the recognition dictionary means, including:

means for acquiring actual background noise of the apparatus;

means for mixing prescribed noiseless signal patterns with the actual background noise acquired by the acquiring means to form signal patterns for learning; and learning recognition means for recognizing the signal patterns for learning by extracting feature vectors for learning from the signal patterns for learning; and means for obtaining the new reference patterns from the feature vectors for learning extracted by the learning recognition means and storing the obtained new reference patterns in the recognition dictionary means, wherein learning by the learning means is iterated for a number of times at different signal-to-noise (S/N) ratios such that the learning is iterated more frequently for an S/N ratio of the signal patterns for learning closer to an S/N ratio given by the prescribed noiseless signal patterns and the actual background noise.

10. An apparatus for time series signal recognition, comprising:

means for inputting input signal patterns for time series signals to be recognized;

means for recognizing the time series signals according to a word spotting scheme using continuous pattern matching, including:

means for extracting a plurality of candidate feature vectors for characterizing an individual time series signal from the input signal patterns;

recognition dictionary means for storing reference patterns with which the individual time series signal is to be matched;

means for calculating similarity values for each of the extracted candidate feature vectors and the reference patterns; and means for determining a recognition result by selecting one of the stored reference patterns that matches with one of the extracted candidate feature vectors by the continuous pattern matching for which the similarity value calculated by the calculating means is greater than a prescribed threshold value; and means for learning new reference patterns to be stored in the recognition dictionary means, including:
  means for acquiring actual background noise of the apparatus;
  means for mixing prescribed noiseless signal patterns with the actual background noise acquired by the acquiring means to form signal patterns for learning; and
  learning recognition means for recognizing the signal patterns for learning by extracting feature vectors for learning from the signal patterns for learning; and
  means for obtaining the new reference patterns from the feature vectors for learning extracted by the learning recognition means and storing the obtained new reference patterns in the recognition dictionary means, wherein the mixing means mixes the actual background noise acquired at different timings with different weights.

11. The apparatus of claim 10, wherein the actual background noise acquired at different timings are weighted differently such that the actual background noise acquired at a timing closer to a timing for starting a recognition of the input signal patterns by the recognizing means is weighted more heavily.

12. A method of time series signal recognition, comprising the steps of:

inputting input signal patterns for time series signals to be recognized;

recognizing the times series signals according to a word spotting scheme using continuous pattern matching, including the steps of:
  extracting a plurality of candidate feature vectors for characterizing an individual time series signal from the input signal patterns;
  storing reference patterns with which the individual time series signal is to be matched in a recognition dictionary;
  calculating similarity values for each of the extracted candidate feature vectors and the reference patterns; and
  determining a recognition result by selecting one of the stored reference patterns that matches with one of the candidate feature vectors by the continuous pattern matching for which the similarity value calculated at the calculating step is greater than a prescribed threshold value; and learning new reference patterns to be stored in the recognition dictionary, including the steps of:
  acquiring actual background noise of the apparatus;
  mixing prescribed noiseless signal patterns with the actual background noise acquired at the acquiring step to form signal patterns for learning;
  carrying out a learning process by recognizing the signal patterns for learning by extracting feature vectors for learning from the signal patterns for learning;
  obtaining the new reference patterns from the feature vectors for learning extracted at the carrying out step; and
  storing the new reference patterns in the recognition dictionary, wherein learning at the learning step is iterated for a number of times at different signal-to-noise (S/N) ratios such that the learning is iterated more frequently for an S/N ratio of the signal patterns for learning closer to an S/N ratio given by the prescribed noiseless signal patterns and the actual background noise.

13. A method of time series signal recognition, comprising the steps of:

inputting input signal patterns for time series signals to be recognized;

recognizing the times series signals according to a word spotting scheme using continuous pattern matching, including the steps of:
  extracting a plurality of candidate feature vectors for characterizing an individual time series signal from the input signal patterns;
  storing reference patterns with which the individual time series signal is to be matched in a recognition dictionary;
  calculating similarity values for each of the extracted candidate feature vectors and the reference patterns; and
  determining a recognition result by selecting one of the stored reference patterns that matches with one of the candidate feature vectors by the continuous pattern matching for which the similarity value calculated at the calculating step is greater than a prescribed threshold value; and learning new reference patterns to be stored in the recognition dictionary, including the steps of:
  acquiring actual background noise of the apparatus;
  mixing prescribed noiseless signal patterns with the actual background noise acquired at the acquiring step to form signal patterns for learning;
  carrying out a learning process by recognizing the signal patterns for learning by extracting feature vectors for learning from the signal patterns for learning;
  obtaining the new reference patterns from the feature vectors for learning extracted at the carrying out step; and
  storing the new reference patterns in the recognition dictionary, wherein the mixing step mixes the actual background noise acquired at different timings with different weights.

14. The method of claim 13, wherein the actual background noise acquired at different timings are weighted differently such that the actual background noise acquired at a timing closer to a timing for starting a recognition of the input signal patterns at the recognizing step is weighted more heavily.

15. A method of time series signal recognition in a time series recognition apparatus, comprising the steps of:

a) receiving input signal patterns for time series signals to be recognized;

b) storing reference patterns with which an individual one of the time series signals is matched, the reference patterns being stored in a recognition dictionary;

c) recognizing the individual one of the time series signals according to a word spotting scheme using continuous pattern matching, including the steps of:
  c1) setting an ending time for the individual one of the time series signals;
  c2) setting an adjustable starting time for the individual one of the time series signals;
  c3) extracting a candidate feature vector for the individual one of the time series signals, the extraction being performed between the adjustable starting time and the ending time of the time series signals;

c4) determining a maximum similarity value for the candidate feature vector as compared with each of the reference patterns stored in the recognition dictionary;

c5) if the maximum similarity value exceeds a threshold level, determining a word within the adjustable starting time and the ending time based on the corresponding reference pattern having the maximum similarity value;

c6) if the maximum similarity value does not exceed the threshold level and if the adjustable starting time is greater than a prescribed amount of time before the ending time, setting a new adjustable starting time that is closer in time to the ending time than a previous adjustable starting time, and returning to step c1); and c7) if the maximum similarity value does not exceed the threshold level and if the adjustable starting time is not greater than the prescribed amount of time before the ending time, setting the new adjustable starting time as the ending time and setting a new ending time that is a second prescribed amount of time after the new adjustable starting time, and returning to step c1); and d) learning new reference patterns to be stored in the recognition dictionary, including the steps of:

d1) acquiring actual background noise of the apparatus;

d2) mixing prescribed noiseless signal patterns with the actual background noise acquired at the acquiring step d1) to form signal patterns for learning;

d3) carrying out a learning process by recognizing the signal patterns for learning by extracting feature vectors for learning from the signal patterns for learning;

d4) obtaining the new reference patterns from the feature vectors for learning extracted at the carrying out step d3); and d5) storing the new reference patterns in the recognition dictionary.

16. The method of claim 15, wherein learning at the learning step is iterated for a number of different noise levels for the actual background noise mixed with the prescribed noiseless signal patterns.

17. The method of claim 16, wherein the number of different noise levels are derived by lessening a difference in noise level of the actual background noise for each successive iteration.

18. The method of claim 16, wherein the number of different noise levels are derived by statistically distributing various noise levels for the actual background noise.

19. The method of claim 16, wherein the number of different noise levels are derived such that a signal-to-noise (S/N) ratio of the signal pattern for learning is gradually reduced to a vicinity of an S/N ratio given by the prescribed noiseless signal patterns and the actual background noise as the learning at the learning step progresses.

20. The method of claim 15, wherein learning at the learning step is iterated for a number of times at different signal-to-noise (S/N) ratios such that the learning is iterated more frequently for an S/N ratio of the signal patterns for learning closer to an S/N ratio given by the prescribed noiseless signal patterns and the actual background noise.

21. The method of claim 15, wherein the acquiring step acquires the actual background noise of an environment for inputting the input speech patterns at the inputting step up to a timing for starting a recognition of the input signal patterns at the recognizing step.

22. The method of claim 15, wherein the mixing step forms the signal patterns for learning from the prescribed noiseless signal patterns by parallel processing, and the carrying out step recognizes the signal patterns for learning by parallel processing.

23. The method of claim 22, wherein a plurality of different levels of the actual background noise are mixed with the prescribed noiseless signal concurrently by parallel processing, so as to concurrently form the signal patterns for learning for a plurality of different signal-to-noise (S/N) levels.

* * * * *